United States Patent

Chupka, Jr.

[11] Patent Number: 5,856,407
[45] Date of Patent: Jan. 5, 1999

[54] PROCESS FOR MAKING BIMODUL, CROSS-LINKED TONER RESIN

[75] Inventor: Francis L. Chupka, Jr., Columbia, Tenn.

[73] Assignee: Image Polymers Company, Wilmington, Mass.

[21] Appl. No.: 952,269

[22] PCT Filed: May 10, 1996

[86] PCT No.: PCT/US96/06681

§ 371 Date: Dec. 11, 1997

§ 102(e) Date: Dec. 11, 1997

[87] PCT Pub. No.: WO96/36652

PCT Pub. Date: Nov. 21, 1996

Related U.S. Application Data

[62] Division of Ser. No. 440,847, May 15, 1995, Pat. No. 5,684,090.

[51] Int. Cl.$^6$ ................................................. C08F 267/04
[52] U.S. Cl. ............................................................. 525/285
[58] Field of Search ............................................... 525/285

[56] References Cited

U.S. PATENT DOCUMENTS

| | | | |
|---|---|---|---|
| 4,146,590 | 3/1979 | Yamamoto et al. | 260/818 R |
| 4,382,128 | 5/1983 | Li | 524/513 |
| 5,684,090 | 11/1997 | Chupka, Jr. | 525/285 |

*Primary Examiner*—Jeffrey T. Smith
*Assistant Examiner*—Wu C. Cheng
*Attorney, Agent, or Firm*—Panitch Schwarze Jacobs & Nadel, P.C.

[57] ABSTRACT

A bimodal, crosslinked toner resin can be prepared in non-aqueous solvent, e.g., toluene, using standard solution polymerization techniques. The resin-forming process prepares a precursor resin from ethylenically unsaturated monomer(s), and then grafts maleic anhydride onto the precursor resin to form a modified precursor resin. The modified precursor resin is reacted with a polyfunctional molecule, e.g. a diol, to provide a crosslinked resin. The process is preferably conducted in the presence of a low molecular weight polymeric additive, e.g., polystyrene, to provide a bimodal as well as crosslinked toner resin composition. With the addition of a colorant, a toner powder may be formed.

22 Claims, No Drawings

PROCESS FOR MAKING BIMODUL, CROSS-LINKED TONER RESIN

CROSS REFERENCE TO RELATED APPLICATIONS

The present application is a section 371 of PCT/US96/06681, filed May 10, 1996, and a division of U.S. application Ser. No. 08/440,847, filed May 15, 1995, now U.S. Pat. No. 5,684,090.

FIELD OF THE INVENTION

The invention is directed to a resinous composition useful as a component of toner powder, a toner powder incorporating said composition, and a method for the preparation of said composition, where the toner powder is useful in reprographic printing.

BACKGROUND OF THE INVENTION

Reprographic printing is the type of printing that is most commonly employed in plain paper copiers and printers. In reprographic printing, paper is electrostatically coated with particles of pigmented toner powder, and then transported to the nip between two rollers. Hot roll fusing is commonly used to fuse the toner powder to the paper. In hot roll fusing, the temperature of the top roll, which comes in direct contact with the unfused toner powder, is maintained at about 150° C.–280° C. The specific temperature depends on the machine design. The bottom roller acts as a pressure roll and is normally constructed with a resilient layer (e.g., silicone rubber). The fusing cycle of reprographic printing consists of passing the toner-covered (toned) paper through the two rollers, where the toner is softened and pressed against the paper. After passing through the rollers, the toner cools and sticks to the paper.

Two important components of toner powder are the toner resin and the colorant. Toner resin, which constitutes the majority of the toner powder formulation, acts as a binder. That is, the toner resin serves to bind the colorant to the paper. The toner should fix, i.e., develop some binding character, to the paper at the relatively low temperature attained during the initial stage of the fusing cycle. Whether this will occur is largely dependent on the melt characteristics of the toner resin.

In addition, the toner should not offset to the top roll at the higher temperatures attained toward the end of the fusing cycle. Any toner which offsets to the hot roll eventually contaminates the pressure roll and subsequent copies. Again, the melt characteristics of the toner resin will influence whether offset occurs. To minimize toner contamination of the hot roll, the roll is typically coated with a "non-sticking" layer, e.g., a fluorocarbon polymer, or is continually wetted with silicone oil. However, the non-sticking layer provides only a partial solution to the offset problem, and toner resin manufacturers have put considerable effort into designing resins that eliminate offset.

Two types of toner resin designs have been used to solve the offset problem. The first employs partially crosslinked, also known as gelled, resins. These resins obtain a high melt viscosity through having a partially crosslinked (gel) polymeric structure. These resins are typically produced by water-based suspension or emulsion, free radical-initiated, polymerization of ethylenically unsaturated monomers, as described for example in U.S. Pat. No. Reissue 31,072 of T. A. Jadwin et al., assigned to Eastman Kodak Company. These partially crosslinked or gelled resins cannot be made via solution polymerization, i.e., starting with the monomers dissolved in organic solvent, because of the insolubility of the product resin in the organic reaction solvent.

Although crosslinked resins are helpful in reducing offset, their presence in a toner formulation is detrimental to the initial fixing of the toner. To counter this, toner manufacturers add low molecular weight resins to their formulations. However, macrophases of crosslinked resin and low molecular weight resin often result, due to the difficulty in obtaining adequate mixing. This inhomogeneity adversely affects toner performance and reproducibility. To obtain a homogeneous blend of crosslinked and low molecular weight resins, the low molecular weight resin can be mixed with the monomers used to prepare the crosslinked resin, prior to initiating the water-based suspension polymerization process that is commonly employed to prepare the crosslinked resin. However, by either approach, one needs to independently prepare and isolate the low molecular weight polymer, and this adds additional cost to the preparation of toner having a gelled resin.

The second approach to obtaining toner resins having the necessary properties for hot roll fusing printing is the preparation of bimodal resins by solution polymerization. The term "bimodal" comes from the observation of two peaks in the molecular weight curve that is obtained upon submitting the resin to gel permeation chromatography. Bimodal resins are typically prepared through the independent preparation of solutions of high and low molecular weight resins, followed by combining the two solutions and removing the solvent. This process provides for thorough mixing between the high and low molecular weight resins, and thus a homogeneous toner resin is produced. However, the toner resins made from these bimodal resins must still bear the cost of the independent production of high and low molecular weight resins.

While in general, solution polymerization processes offer several advantages over suspension polymerization, one disadvantage is that the solution polymerization technique is not amenable to the production of crosslinked or gelled resins, due to their insolubility in the reaction medium. Thus, bimodal resins prepared from solution polymerization cannot have any substantial degree of crosslinking. There is thus a need in the art for methodology that employs solution polymerization procedures to provide bimodal crosslinked toner resin.

SUMMARY OF THE INVENTION

The present invention provides a process for preparing a crosslinked resinous composition comprising the steps of (a) preparing a solution of maleic anhydride, free-radical initiator, and precursor resin formed by the polymerization of at least one ethylenically unsaturated monomer, (b) heating the solution of step (a) to a first temperature sufficient to cause maleic anhydride to graft onto said precursor resin and form a solution of modified precursor resin having appended cyclic anhydride groups, (c) adding to said solution of modified precursor resin having appended cyclic anhydride groups a polyfunctional molecule having functional groups reactive with an anhydride group, and (d) heating the solution of step (c) to a second temperature sufficient to cause covalent bonding between said functional groups and said appended cyclic anhydride groups and thereby form a crosslinked resin. Preferably, the solution of step (c) additionally contains an additive resin, wherein said additive resin is a polymeric compound having a number average molecular weight less than the number average molecular weight of said precursor resin. Although each of the above steps could alternatively be carried out neat, i.e. without solvent in high shear apparatus, such as an extruder, solution polymerization is preferred.

The crosslinked resin as prepared above, which is useful in a toner resin formulation, has a primary and a secondary structure, wherein the primary structure comprises repeating units independently selected from the group consisting of —$CH_2$—CH(Ph)—, —$CH_2$—CH($CO_2R^1$)— and —$CH_2$—C($CH_3$)($CO_2R1$)—, wherein Ph represents phenyl or substituted phenyl, and the secondary structure is formed by crosslinks between at least two aliphatic carbons of the primary structure through a multivalent radical selected from the group consisting of $R^2[-(A-O)_a-LH_b]_{c-d}[-(A-O)_a-LH_{b-1}-R^3]_d$, $LH_{(b+1-g)}[(A-O)_a-A-LH_b]_{g-w}[(A-O)_a-A-LH_{b-1}R^3]_g$, $R^3O[R^4-OC(=O)-R^5-C(=O)O-R^4-O-]_n-R^3$, and $R^3NH-[R^6-NH(C=O)-R^5-C(=O)NH-R^6-NH-]_n-R^3$ wherein, independently at each occurrence, $R^2$ is a multivalent organic radical having 2 to about 20 carbon atoms, $R^4$ is a $C_2$-$C_{20}$ divalent organic moiety, $R^5$ is a direct bond or a $C_1$-$C_{12}$ divalent organic moiety, $R_6$ is a $C_2$-$C_{12}$ divalent organic moiety, b is 1 when L is O or S, and 2 when L is N, c is an integer from 2 to 6, d is an integer from 2 to 6, g is 2 when L is oxygen or sulfur and 2 or 3 when L is nitrogen, n is an integer from about 2 to about 100, s is 0 or an integer from 1 to about 50, w is 2 when L is oxygen or sulfur, and 2 or 3 when L is nitrogen, w is greater than or equal to g, A is —$CH_2CH_2$— or —$CH_2CH(CH_3)$—, L is oxygen (O), nitrogen (N) or sulfur (S), and $R^3$ is a divalent radical that joins either oxygen, nitrogen or sulfur, depending on the identity of L, to the primary structure, and is independently at each occurrence selected from the group of radicals having the structures D—CH (COOH)—$CH_2$—C(=O)—, D—CH ($CH_2$COOH)—C(=O)— and —C(=O)—CH(D)—CH—C=O— wherein D is a direct bond to a carbon atom of the primary structure, and the structure —C(=O)—CH(D)—CH—C=O— may only be present if the polyfunctional molecule contains a primary amine ($NH_2$) group, such that both open valencies of the —C(=O)—CH(D)—CH—C=O— group may bond to the primary amine group to form an imide group.

Another aspect of the invention is a toner powder comprising the crosslinked resin composition described above and at least one colorant.

DETAILED DESCRIPTION OF THE PREFERRED EMBODIMENTS

The present invention provides a process wherein solution polymerization may be used to prepare a crosslinked resin, which upon combination with an additive resin, provides a composition that is useful in the preparation of toner resin and toner powder. As used herein, the terms polymer and resin are interchangeable. As the word resin is commonly used in the art to refer to materials used as binders in toner powders, the term resin will be used herein. The composition that comprises the additive and crosslinked resins of the invention will be referred to herein as the resin composition, although it may just as appropriately be referred to as a polymeric composition.

The term "solution polymerization" means that the crosslinked resin is prepared in an organic solvent. Polymerization techniques that utilize water or substantially aqueous solvents, such as emulsion or suspension polymerization, are not included within the term solution polymerization as used herein.

By addition of a colorant and optionally performance enhancing additives such as charge control agents and flow enhancers, etc., to the resin composition, a toner powder may be prepared, where said toner powder is useful in developing electrostatic images used in image forming methods such as electrophotography or electrostatic printing, also known as reprographic printing. The resin composition is particularly suited for use in toner powders that are fixed to a substrate by hot roller fusing reprographic printing.

The crosslinked resin of the invention is preferably prepared according to a three step procedure. In the first step, a precursor resin is prepared by polymerizing at least one ethylenically unsaturated molecule. In the second step, the precursor resin is reacted with maleic anhydride in the presence of a free-radical initiator to produce a modified precursor resin which has appended cyclic anhydride groups. Finally, in the third step, the modified precursor resin is reacted with a polyfunctional molecule, having functional groups reactive with anhydride groups, to produce the crosslinked resin of the invention.

The precursor resin is the polymerization product of at least one ethylenically unsaturated molecule. Molecules that can be polymerized may be referred to herein as monomers. The precursor resin can be selected from, for example, polymers or copolymers of ethylenically unsaturated monomers including esters of acrylic acid and $C_1$-$C_{18}$ alcohol, also known as acrylic esters, such as methyl acrylate, ethyl acrylate, propyl acrylate, butyl acrylate, octyl acrylate, cyclohexyl acrylate, lauryl acrylate, stearyl acrylate, benzyl acrylate, furfuryl acrylate, tetrahydrofuranyl acrylate, hydroxyethyl acrylate, hydroxybutyl acrylate; N,N-dialkylaminoalkanol ester of acrylic or methacrylic acid, wherein the alkyl groups are independently methyl, ethyl or propyl and the alkanol group is methylol, ethylylol or propylol, such as N,N-dimethylaminomethylacrylate ester, N,N-diethylaminoethylacrylate ester, N,N-dimethylaminopropylacrylate ester, N,N-diethylaminopropylmethacrylate ester, N,N-dimethylaminomethyl methacrylate ester, and N,N-dimethylaminoethylmethacrylate ester; esters of methacrylic acid and $C_1$-$C_{18}$ alcohol, also known as methacrylic esters, such as methyl methacrylate, ethyl methacrylate, propyl methacrylate, butyl methacrylate, octyl methacrylate, lauryl methacrylate, stearyl methacrylate, cyclohexyl methacrylate, benzyl methacrylate, furfuryl methacrylate, tetrahydrofurfuryl methacrylate, hydroxethyl methacrylate, hydroxpropyl methacrylate, hydroxybutyl methacrylate; styrenic compounds including styrene and substituted styrene where the term "substituted styrene" is intended to include alkyl and halo substituted styrene as well as styrenesulfonic acid, where exemplary and non-limiting examples of substituted styrene include α-methylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-(n-butyl)styrene, p-(tert-butyl)styrene, p-(n-hexyl)styrene, p-(n-octyl)styrene, p-(n-nonyl)styrene, p-(n-decyl)styrene and p-(n-dodecyl)styrene; dialkyl esters of α,β-unsaturated dibasic acids such as dibutyl maleate, dioctyl maleate, dibutyl fumarate, and dioctyl fumarate; vinyl esters such as vinyl acetate and vinyl propionate; nitrogen-containing vinyl monomers such as acrylonitrile and methacrylonitrile;

α,β-unsaturated carboxylic acids such as acrylic acid, methacrylic acid and cinnamic acid; α,β-unsaturated dicarboxylic acids such as maleic acid, fumaric acid, and itaconic acid; monoester of α,β-unsaturated dicarboxylic acids such as monomethyl maleate, monoethyl maleate, monobutyl maleate, monooctyl maleate, monomethyl fumarate, monoethyl fumarate, monobutyl fumarate and monooctyl fumarate; other monoolefinically α,β-unsaturated compounds such as acrylamide and methacrylamide, including derivatives thereof such as N-substituted acrylamide, N-substituted methacrylamide, and acrylamidopropanesulfonic acid; polyvinyl compounds such as divinyl compounds, i.e., molecules having two vinyl groups, including divinylbenzene, diacrylic acid compounds, i.e., molecules having two acrylic acid groups, dimethacrylic acid compounds, i.e., molecules having two methacrylic acid groups, diacrylate compounds, i.e., molecules having two acrylate groups, including (poly)ethyleneglycol diacrylate, and dimethacrylate compounds, i.e., molecules having two methacrylate groups, including (poly)ethyleneglycol dimethacrylate; and unsaturated conjugated diolefin monomers such as butadiene, chloroprene, neoprene and isoprene. As used herein, the term α,β-unsaturated refers to the C=C—C=O group, i.e., olefinic unsaturation adjacent to, i.e, in the α position, relative to a carbonyl group.

Among the foregoing, the precursor resin is preferably prepared from ethylenically unsaturated monomers selected from the group consisting of acrylic acid, acrylic ester, methacrylic acid, methacrylic ester, styrene, substituted styrene and divinyl compounds including diacrylic acid, dimethacrylic acid, diacrylate and dimethacrylate compounds. The preferred monomers have 3 to about 21 carbon atoms. In a preferred embodiment, styrene is copolymerized with an acrylic monomer, optionally in the presence of a divinyl compound, to prepare the precursor resin. While one or more substituted styrenes may be employed in lieu of, or in addition to, styrene, such substituted styrene monomers are generally not preferred comonomers because the presence of substituted styrene tends to diminish the molecular weight of the product resin.

The preferred acrylic monomer may have either an acrylic or methacrylic functional group. Monofunctional acrylic or methacrylic monomers have the formula $CH_2$=CH—$CO_2$—$R^1$ or $CH_2$=CH($CH_3$)—$CO_2$—$R^1$, respectively, wherein $R^1$ is H or $C_1$-$C_{18}$ hydrocarbon, also called a hydrocarbyl, group. Preferably, $R^1$ is $C_1$-$C_{12}$ alkyl, and more preferably $R^1$ is n-butyl. Preferred monofunctional acrylic or methacrylic monomers are: butyl acrylate including n-butyl acrylate, 2-ethylhexyl acrylate, lauryl acrylate, acrylic acid, methyl methacrylate, butyl methacrylate including n-butyl methacrylate, 2-ethylhexylmethacrylate, lauryl methacrylate and methacrylic acid.

The monomer used to prepare the precursor resin may include a small amount of polyvinyl compound. The term polyvinyl compound is meant to include molecules having at least two vinyl groups, i.e., two $CH_2$=C($R^a$)($R^b$) groups in the molecule, where $R^a$ and $R^b$ are intended to generally represent organic moieties or hydrogen. As used herein and throughout the application, the term organic moiety refers to atomic groupings formed primarily of carbon and hydrogen, with oxygen and nitrogen optionally present in lesser amounts than the carbon, as is understood in the art. A preferred polyvinyl compound is a divinyl compound, where exemplary and non-limiting examples of preferred divinyl compounds include divinylbenzene, (poly)ethyleneglycol diacrylate and (poly)ethyleneglycol dimethacrylate.

Polyvinyl compound in admixture with one or more other ethylenically unsaturated monomers will generally provide a crosslinked precursor resin, or at least a precursor resin having some degree of branching. As used herein, the term precursor resin includes crosslinked precursor resins and precursor resins having some degree of branching. The presence of branching serves the desirable purpose of increasing the molecular weight of the precursor resin. A precursor resin that is too highly branched or crosslinked is ill-suited for the instant invention however, because such branching or crosslinking may significantly and undesirably reduce the solubility of the precursor resin in non-aqueous solvent. As the proportion of polyvinyl compound in admixture with other ethylenically unsaturated monomer increases, the precursor resin produced therefrom will have an increasing amount of crosslinking, and thus will eventually become completely insoluble in non-aqueous solvent. Thus, the polyvinyl compound should constitute a minor proportion of the ethylenically unsaturated monomer.

When specifying the amount of polyvinyl compound which may be present in the ethylenically unsaturated monomer, it is preferable to specify the amount in terms of parts of polyvinyl compound to 100 parts of ethylenically unsaturated monomer. The amount of polyvinyl compound which may be present in the ethylenically unsaturated monomer will depend on the nature of the polyvinyl compound. Thus, a polyvinyl compound having two vinyl groups may generally be present to a greater extent than a polyvinyl compound having more than two vinyl groups. Preferably, the parts of divinyl compound to 100 parts of ethylenically unsaturated monomer is about 0.01 to no more than about 10, and more preferably is about 0.02 to about 5. With the preferred divinyl compounds of the invention, a concentration of about 0.05 parts to about 2 parts, based on the total weight of monomer, provides a precursor resin having a satisfactory level of crosslinking/branching. Reaction mixtures having the aforesaid amount of divinyl compound generally produce precursor resin that is substantially soluble in non-aqueous solvent.

The precursor resin is preferably prepared by bulk or solution polymerization, in either a batch or continuous mode, however emulsion or suspension techniques may also be employed. Solution polymerization is advantageous, as the subsequent steps necessary to form the crosslinked resin can then be accomplished without need to isolate the precursor resin free of the reaction medium in which it is formed.

In a preferred method, bulk polymerization of the monomer in the absence of solvent and initiator is followed by the addition of solvent and initiator to provide further polymerization. Thus, to prepare a preferred precursor resin, acrylic monomer, e.g., n-butyl acrylate, and styrene are contacted in a suitable container to provide a homogeneous solution. The solution is maintained for a time and at a reaction temperature sufficient to achieve at least partial polymerization of the monomers. Then a solution of non-aqueous solvent and initiator is added, optionally with polyvinyl compound, e.g. divinyl benzene, and the reaction mixture is maintained for a time and at a reaction temperature sufficient to achieve supplemental polymerization of the monomers and provide the precursor resin as a solution. A batch process wherein all monomers are combined at the start of the reaction may also be employed.

The solvent is any material which is a liquid, miscible with styrene and acrylic monomer at the reaction temperature, and is substantially unreactive with the free-radical initiator. Exemplary solvents include aliphatic and aromatic hydrocarbon solvents. Aromatic solvents are a preferred solvent, where exemplary aromatic solvents include, without limitation, benzene, toluene, xylene, ethyl benzene and cumene. Other solvents, recognized by the art as being essentially unreactive with free-radical initiators and thus suitable for the free-radical polymerization of ethylenically unsaturated monomers include cellosolve, ethyl acetate and isopropyl alcohol.

The initiator can be any material that is capable of initiating the polymerization of an ethylenically unsaturated monomer. Exemplary polymerization initiators include, without limitation, azo compounds such as 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutyrate, 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile, 2,2'-azobis(2-methylpropane); ketone peroxides such as methyl ethyl ketone peroxide, acetylacetone peroxide, cyclohexanone peroxide; peroxyketals such as 1,1-(bis-t-butylperoxy)-3,5,5-trimethylcyclohexane, 1,1-bis-(t-butylperoxy)cyclohexane, 2,2-bis(t-butylperoxy)butane; hydroperoxides such as t-butyl hydroperoxide, cumene hydroperoxide, 1,1,3,3-tetramethylbutyl hydroperoxide; dialkyl peroxides such as di-t-butyl peroxide, t-butyl cumyl peroxide, dicumyl peroxide, 2,5-dimethyl-2,5-di(t-butylperoxy)hexane, α,α'-bis(t-butylperoxyisopropylbenzene); diacyl peroxides such as isobutyryl peroxide, octanoyl peroxide, decanoyl peroxide, lauroyl peroxide, 3,5,5-trimethylhexanoyl peroxide, benzoyl peroxide, m-toluyl peroxide; peroxydicarbonates such as diisopropyl peroxydicarbonate, di-2-ethylhexyl peroxydicarbonate, di-n-propyl peroxydicarbonate, di-2-ethoxyethyl peroxydicarbonate, dimethoxyisopropyl peroxydicarbonate, di(3-methyl-3-methoxybutyl) peroxydicarbonate; sulfonyl peroxides such as acetylcyclohexylsulfonyl peroxide; peroxyesters such as t-butyl peroxyacetate, t-butyl peroxyisobutyrate, t-butyl peroxyneodecanoate, cumyl peroxyneododecanoate, t-butyl peroxy-2-ethylhexanoate, t-butyl peroxylaurate, t-butyl peroxybenzoate, t-butyl peroxyisopropylcarbonate, di-t-butyl diperoxyisophthalate; and the like.

The type and quantity of such polymerization initiator may be suitably selected according to the reaction temperature and conversion of the bulk polymerization. The initiator is normally used in an amount of 0.01–10 parts by weight per 100 parts by weight of the monomer employed.

Lupersol® 231, a peroxyketal with the chemical name (1,1-di(t-butylperoxy)-3,3,5-trimethylcyclohexane, is a preferred initiator and is available from Elf Atochem North America, Inc., Philadelphia, Pa. Di-t-butylperoxide is another preferred initiator, that is also available from Elf Atochem. AIBN, a common abbreviation for azobisisobutyronitrile, also known as 2,2'-azobis(2-methylpropanenitrile), is available from Du Pont Chemicals and Pigments, Wilmingtion, Del., under the registered trademark VAZO 64.

The temperature of the reaction is preferably about 80° C. to about 140° C., and will depend in part on whether, and which, initiator is selected to be included in the reaction mixture. The rate and extent of conversion of monomer into precursor resin can be controlled by setting the reaction temperature and reaction time, as is well known in the art.

The precursor resin has a relatively high molecular weight of about 1,000 to about 200,000, and preferably has a molecular weight of about 2,000 to about 200,000, and more preferably of about 5,000 to about 75,000, where the molecular weight values here and throughout the application are number average molecular weight values obtained using gel permeation chromatography with polystyrene standards and THF as the eluent. Specific equipment and conditions employed in the gel permeation chromatography used to characterize the resin described herein are as follows: GPC equipment from Waters Corporation; Data Manager: Millennium 2010; Injector: Model U6K; Pump: Model 610; Detector: Model 410 Differential Refractometer; Columns: Showdex KF 800P, Showdex KF 802, Showdex KF 806L (2); Column Temperature: 40° C.; Flow Rate: 1 mm/min; elution solvent: THF. A typical precursor resin using the above-described equipment has $M_w$ of 363,116, $M_n$ of 26,182, $M_w/M_n$ of 13.9, $M_z$ of 1,158,024 and $M_z/M_n$ of 49.2.

In order to obtain the high molecular weight precursor, the reaction conditions must be carefully selected and controlled. Suitable reaction conditions are provided in, e.g., U.S. Pat. Nos. 5,084,368 and 5,266,434, in the descriptions therein of the preparation of what is called the "high molecular weight resin". The entire disclosure of U.S. Pat. Nos. 5,084,368 and 5,266,434 are herein incorporated by reference.

In the second step towards preparation of the crosslinked resin, maleic anhydride is grafted onto the precursor resin, to provide a modified precursor resin. The grafting reaction is preferably conducted in a solvent. A solution of precursor resin and maleic anhydride is formed, and then the solution is contacted with a free-radical initiator at a temperature and for a reaction time sufficient to achieve grafting of the maleic anhydride onto the precursor resin. However, the grafting reaction may also be conducted neat, i.e., free of solvent, by placing the reactants in an extruder or like piece of equipment that will melt and knead the precursor resin.

The reaction of maleic anhydride with the precursor resin, in the presence of a free-radical initiator, produces the modified precursor resin of the invention. The structure of the modified precursor resin is not known with 100% certainty, but presumably takes the form of succinic anhydride groups bonded through a single —CH— group to the carbon backbone of the precursor resin. It should be appreciated that the grafting of maleic anhydride onto a resin produces a different material than the copolymerization of maleic anhydride, or maleate esters, with ethylenically unsaturated monomer, where in the later case succinic anhydride groups or esters thereof are present as part of the backbone of the copolymer, rather than being appended thereto as in the instant invention.

The maleic anhydride is any standard commercial grade of maleic anhydride. Maleic anhydride is available from a number of commercial sources, including Aldrich Chemical Company, Milwaukee, Wis.

The solvent, when present, is preferably xylene, however can be any other non-reactive solvent, preferably having a low toxicity and being easily handled. Exemplary, non-limiting solvents include the solvents set forth above in regard to the preparation of the precursor resin. Hydroxy-containing solvents, including water and other aqueous-based solvents, are not suitable for the maleation reaction, unless the hydroxyl group should be so hindered as to be unreactive with maleic anhydride. Conveniently, the solvent used in the preparation of the precursor resin is left in contact with the precursor resin, and the precursor resin/solvent mixture is contacted with maleic anhydride and an initiator to provide the modified precursor resin.

Sufficient maleic anhydride should be contacted with the precursor resin to provide for a modified precursor resin having an anhydride number of about 1 to about 80. A modified precursor resin having an anhydride number within the stated range may be obtained upon contacting precursor resin and maleic anhydride in a precursor resin:maleic anhydride weight ratio of about 99.9:0.1 to about 80:20. More preferably, the two reactants are contacted in a precursor resin:maleic anhydride weight ratio is about 99:1 to about 85:15.

The anhydride number as stated above is measured by the following procedure. A sample of resin, of known weight between about 2 and about 10 grams, is weighed and placed into a 200–300 mL Erlenmeyer flask, and about 100 mL of 1:1 xylene:n-butanol is added thereto to dissolve the resin. Heating at about 45° C. for about two hours is typically necessary to achieve complete dissolution of the resin. If the resin does not readily dissolve, a small amount of acetone may be added. If the resin/solvent mixture is turbid, a small amount of water may be added.

The homogeneous solution is then titrated with a preliminarily standardized KOH/ethanol solution using phenolphthalein as the indicator. The process is then repeated, using the same 1:1 xylene:n-butanol solution but without dissolving resin therein. This provides a blank for comparison. The acid value is calculated from the consumption of the KOH/ethanol solution based on the following equation:

Anhydride No. =

[{vol(ml) of KOH solution needed to titrate resin solution} −

{vol(ml) of KOH solution needed to titrate blank solution} ×

$N \times 56.1$/sample weight]

wherein N denotes the concentration,.in normality, of KOH in the KOH/ethanol solution.

The above-mentioned KOH solution is prepared as follows. First, 1.5 g of KOH is dissolved in about 3 mL of water, and 200 mL of ethanol and 30 mL of water are added thereto, followed by stirring. After standing, a uniform clear solution is formed. Then, the concentration of the KOH/ethanol solution thus obtained is standardized by a 1/10N-HCl standard solution that may be obtained from several commercial supply houses, including Aldrich Chemical Company. The concentration of the KOH/ethanol solution is approximately 0.1N.

The above-described method to obtain an anhydride number is based on the ability of the KOH to titrate one of the two carboxyl groups in a hydrolyzed anhydride moiety. An alternative method to characterize the resin is to measure its acid value, which titrates both carbonyl groups of an anhydride, and may be done as follows. Dissolve 2 grams of resin in 30 mL dioxane and 10 mL pyridine. Then add 20 mg dimethylpyridine and 3.5 mL water. Reflux this mixture for 4 hours and then cool to room temperature. Titrate the cooled solution with phenolphthalein to the endpoint using 0.1N KOH in tetrahydrofuran. The calculation of acid value, and the method to prepare the KOH/THF solution are essentially as described above.

The final step in the preparation of the crosslinked resin of the invention entails crosslinking the modified precursor resin. This is accomplished by reacting a polyfunctional molecule having functionality reactive with the carbonyl groups of an anhydride moiety that is present in the modified precursor resin. Exemplary functional groups are hydroxyl, amine and mercaptan groups. The crosslinking agent has at least two reactive functional groups, and thus include diols, triols and other polyols, diamines, triamines and other polyamines, and thiols, dithiols and other polythiols.

Exemplary polyfunctional molecules may be represented by the formula $R^2[-(A-O)_s-LH_b]_c$ wherein $R^2$ is a multivalent organic moiety having 2 to about 22 carbon atoms, preferably about 4 to about 12 carbon atoms, and covalent attachment to a number "c" of functional groups of the formula $-(A-O)_s-LH_b$, where c is an integer from 2 to 6. The designation L, independently at each occurrence, represents oxygen (O), nitrogen (N) or sulfur (S) having bonded thereto "b" number of hydrogen atoms such that b is 1 when L is O or S, and b is 2 when L is N. The designation "$(A-O)_s$" represents a chain having a number s alkylene oxide groups, where O represents oxygen and A is $-CH_2CH_2-$ or $-CH_2CH(CH_3)-$, as may be prepared, for example, from ethylene oxide or propylene oxide, respectively. The designation s at each occurrence is independently 0 or an integer from 1 to about 50.

Exemplary polyfunctional molecules may also be represented by the formula $LH_{(b+1-g)}[-(A-O)_s-A-LH_b]_g$, where L is defined above, H is hydrogen, b is defined above, g is 2 when L is oxygen or sulfur and is 2 or 3 when L is nitrogen, A is defined above and O is oxygen.

Further exemplary polyfunctional molecules may be represented by the formula $HO-[R^4-OC(=O)-R^5-C(=O)O-R^4-O]_n-H$ or $H_2N-[R^6-NH(C=O)-R^5-C(=O)NH-R^6-NH]_n-H$, where $R^4$ is a $C_2-C_{20}$ divalent organic moiety, preferably a hydrocarbon or a moiety formed exclusively of carbon, hydrogen and oxygen, and optionally including unsaturated carbon-carbon bonds, $R^5$ is a direct bond or a $C_1-C_{12}$ divalent organic moiety, preferably a hydrocarbon and optionally including unsaturated carbon-carbon bonds, $R_6$ is a $C_2-C_{12}$ divalent organic moiety, preferably a hydrocarbon and more preferably aliphatic. These polyester diols of the formula $HO-[R^4-OC(=O)-R^5-C(=O)O-R^4-O]_n-H$, and polyamindoamines of the formula $H_2N-[R^6-NH(C=O)-R^5-C(=O)NH-R^6-NH]_n-H$, are conveniently prepared by reaction of diols and diacids, or diamines and diacids, respectively.

Representative diols include aliphatic diols such as butanediol and ethylene glycol, as well as aromatic diols including bisphenol A, ethoxylated or propoxylated bisphenol A, and the like. Representative diacids, where anhydrides may react as a functional equivalent to a diacid, include aliphatic diacids such as maleic and fumaric acid or anhydride, as well as aromatic diacids such as terephthalic acid, terephthalic anhydride, isophthalic acid, isophthalic anhydride, phthalic acid, phthalic anhydride and the like. Representative diamines include aliphatic diamines such as ethylene diamine and diethylenetriamine. The molecular weights of the polyesterdiols and polyamidoamines are preferably in the range of about 200 to about 15,000, when reported as number average molecular weight, and thus "n" has a value of about 2 to about 100.

Preferred polyfunctional molecules are polyhydric molecules, with dihydric molecules, also known as diols, being particularly preferred. Preferred diols include, without limitation, 1,2-ethane diol, 1,2-propane diol, 1,3-propane diol, 1,3-butane diol, 1,4-butane diol, 1,6-hexane diol, neopentyl glycol, diethylene glycol, dipropylene glycol, ethoxylated and/or propoxylated derivatives of bisphenol-A, polyalkylene oxides including poly(ethylene oxide) and poly (propylene oxide), and hydrogenated bis-phenol-A. Trihydric molecules, also known as triols, that may serve as the polyfunctional molecule of the invention include, without limitation, glycerol, trimethylolpropane, and trimethylolethane.

The polyfunctional molecule may be added to the solution of modified precursor resin as obtained at the conclusion of the aforedescribed grafting reaction with maleic anhydride. The mixture is then heated under a nitrogen atmosphere at a temperature sufficient to remove the majority of the solvent. The reaction mixture is then taken to a temperature sufficient to achieve reaction between the carbonyl groups of the anhydride functionality present in the modified precursor resin and the functional groups of the polyfunctional molecule. This reaction provides for the crosslinking of the modified precursor resin.

A temperature of about 120° C. to about 200° C. for about 1 hour is typically sufficient when the polyfunctional molecule is a diol such as 1,4-butanediol. Higher temperatures, longer reaction times and/or addition of an esterification catalyst may be used to achieve the crosslinking reaction, and may be advantageously employed if the polyfunctional molecule contains secondary hydroxy groups. A time period of about 4 minutes to about 3 hours is typically sufficient to complete the crosslinking reaction. Preferably, the reaction mixture is heated to distill off the solvent, then the molten resin is taken to a temperature of about 150° C. to about 190° C. for about 1 hour, and then taken under vacuum of about 10 mm Hg for about 1 hour before being discharged from the reaction flask.

The crosslinking reaction also can be carried out in high shear processing equipment typically used in toner production (e.g., twin or single screw extruders, Banbury mixer, or two roll mill). In this case the uncrosslinked, maleated precursor resin is isolated by removing the solvent by distillation at 25°–190° C. under nitrogen followed by 190°–200° C./10 mmHg. The maleated resin and crosslinking resin (e.g., a diol) are charged to the processing equipment (e.g., extruder) and processed at 120°–200° C. to afford a crosslinked resin.

In addition, the other components of the toner formulation may be charged to the processor with the resin and crosslinking resin in order to produce a crosslinked toner directly.

The crosslinked resin of the invention may be understood to have a primary and a secondary structure, in analogy with terminology commonly used in biochemistry to describe proteins. Thus, the primary structure corresponds to the linear arrangement formed by polymerization of the ethylenically unsaturated monomer, e.g., the resin formed by copolymerization of styrene and acrylate monomer. The secondary structure is produced by a crosslinking reaction that occurs between the anhydride groups which have been grafted onto the precursor resin and the polyfunctional molecule.

According to a preferred embodiment, the primary structure comprises repeating units independently selected from the group consisting of —CH$_2$—CH(Ph)—, —CH$_2$—CH (CO$_2$R$^1$)— and —CH$_2$—C(CH$_3$)(CO$_2$R$^1$)—, wherein Ph is phenyl or substituted phenyl and R$^1$ is H or C$_1$–C$_{18}$ hydrocarbon, and the secondary structure is formed by crosslinks between at least two aliphatic carbons of the primary structure through at least one multivalent radical selected from the group consisting of R$^2$[—(A—O)$_s$—LH$_b$]$_{c-d}$[—(A—O)$_s$—LH$_{b-1}$—R$^3$]$_d$, LH$_{(b+1-g)}$[(A—O)$_s$—A—LH$_b$]$_{g-w}$[(A—O)$_s$—A—LH$_{b-1}$R$^3$]$_g$, R$^3$O—[R$^4$—OC(=O)—R$^5$—C(=O)O—R$^4$—O]$_n$—R$^3$, and R$^3$NH—[R$^6$—NH(C=O)—R$^5$—C(=O)NH—R$^6$—NH]$_n$—R$^3$ wherein R$^2$, R$^4$, R$^5$, R$^6$, A, L, b, c, g, n and s are as defined previously and are independently assigned at each occurrence, d is an integer from 2 to 6 and indicates a number of bonds formed between a polyfunctional molecule and the primary structure, w is a number of bonds formed between a polyfunctional molecule and the primary structure, where w equals 2 when L is oxygen or sulfur, and 2 or 3 when L is nitrogen, such that w is greater than or equal to g, and wherein R$^3$ is a divalent radical that joins either oxygen, nitrogen or sulfur, depending on the identity of L, to the primary structure, and is independently at each occurrence selected from the group of radicals having the structures D—CH(COOH)—CH$_2$—C(=O)—, D—CH(CH$_2$COOH)—C(=O)— and —C(=O)—CH(D)—CH—C=O— wherein D is a direct bond to a carbon atom of the primary structure, and the structure —C(=O)—CH(D)—CH—C=O— may only be present if the polyfunctional molecule contains a primary amine (NH$_2$) group, such that both open valencies of the —C(=O)—CH(D)—CH—C=O— group may bond to the primary amine group so as to form an imide group.

As an illustration, and when R$^2$ is a divalent organic moiety and the polyfunctional molecule is a diol, then crosslinks between the primary structure may have one or more of the formulas

—CH(COOH)—CH$_2$—C(O)—O—R$^2$—O—C(O)—CH$_2$—CH(COOH)—,

—CH(COOH)—CH$_2$—C(O)—O—R$^2$—O—C(O)—CH(CH$_2$(COOH))—,

—(CH$_2$(COOH))CH—C(O)—O—R$^2$—O—C(O)—CH$_2$—CH(COOH)—, and

—(CH$_2$(COOH) )CH—C(O)—O—R$^2$—O—C(O)—CH(CH$_2$(COOH))—.

Preferably, R$^1$ is C$_4$–C$_{12}$ alkyl, and more preferably R$^1$ is butyl. Preferably R$^2$ is C$_4$–C$_{12}$ alkyl, aryl or alkylaryl. Ethoxylated and propoxylated bisphenol A, and 1,4-butanediol are preferred multifunctional molecules according to the invention.

It is not possible to identify, with 100% confidence, those carbon atoms on the primary structure that are joined together in crosslinks through a polyfunctional molecule as set forth above. However, well-known principles of radical stability teach that carbons next to aromatic rings can stabilize free radicals, and thus are likely sites for attachment of the crosslinking chains.

According to a preferred embodiment of the invention, the third step in the preparation of the crosslinked resin, i.e., the reaction of the polyfunctional molecule with modified precursor resin, is conducted in the presence of an additive resin. The additive resin of the invention can be any polymeric material having a number average molecular weight within the range of about 1,000 to about 10,000, preferably about 3,000 to about 8,000, and more preferably about 4,500 to about 5,500.

The additive resin preferably has a T$_g$ in the range of about 50° C. to about 70° C., and more preferably has a Tg in the range of about 55° C. to about 62° C. When the additive resin has a Tg lower than the preferred range, then toner powder made therefrom tends to block, i.e., the toner resin particles tend to pack together rather than form a free-flowing powder. When the additive resin has a Tg higher than the preferred range, then toner powder made therefrom will resist fixing to the paper during the printing process.

The additive resin may be selected from, for example, the same polymers or copolymers that constitute the aforedescribed precursor resin used in the preparation of the crosslinked resin. However, the molecular weight of the additive resin is necessarily less than the molecular weight of the precursor resin. Therefore, little or no divinyl compound should be used in the preparation of the additive resin. Preferred additive resins are polymers and copolymers formed from at least one of styrene, substituted styrene, acrylic acid, acrylic ester, methacrylic acid and methacrylic ester. Polystyrene and copolymers of styrene with alkyl acrylates, alkyl methacrylates, acrylic acid, or methacrylic acid are the particularly preferred additive resins according to the invention.

The additive resin can be prepared according to emulsion or suspension polymerization techniques, however when the additive resin is a styrene/acrylic or polystyrene resin, it is preferably prepared by solution polymerization. When solution polymerization is used to prepare the additive resin, a general preparative procedure is to disperse the monomer(s) in a suitable non-aqueous solvent and in the presence of an initiator. The mixture is maintained with stirring at a temperature and reaction time until resin formation is complete.

The initiator can be any material known in the art capable of initiating free-radical polymerizations. The initiator classes, and specific initiators, described previously in regard to the preparation of the precursor resin are suitable for preparation of the additive resin. Di-tert-butyl peroxide is a preferred initiator for the preparation of the additive resin.

In a solution polymerization reaction to prepare the additive resin, the solvent is non-aqueous and miscible with the monomer(s) at the reaction temperature. The solvent should be substantially inert to reaction with the free-radical initiator. Exemplary solvents include, without limitation, benzene, toluene, ethyl benzene, cumene and xylene. Water is preferably not present to any substantial extent in the solvent.

In order to obtain additive resin having a desirably low molecular weight, the reaction conditions must be carefully selected and controlled. Two of the most critical reaction parameters to control are initiator concentration and reaction temperature. The concentration of the initiator will depend not only on the relative amounts of initiator and solvent+ monomer employed to make the additive resin, but also on the rate of initiator addition in conjunction with the reaction temperature. The reaction temperature in turn will be partially set by the thermal stability of the initiator. The monomer concentration is also important, in conjunction with the chain transfer ability of the solvent.

In order to obtain a styrene acrylic copolymer additive resin with a molecular weight of about 5,000, it is preferred to contact the monomers with about 3 to about 8 mol % of initiator, at a temperature such that the half-life of the initiator is about 1 hour. In general, as the reaction temperature is increased, the molecular weight of the resulting resin decreases. Also, as the amount of substitution on the aromatic solvent or the styrenic compound increases, the more chain transfer will occur, providing a lower molecular weight resin. Thus, xylene is a preferred solvent. Preferred comonomers with styrene are alkyl acrylates, alkyl methacrylates, acrylic acid, and methacrylic acid, as were used to prepare the precursor resin. Polystyrene is also a preferred additive resin.

A suitable continuous process for the preparation of styrene/acrylate additive resin according to the instant invention is described in U.S. Pat. No. 4,963,456, the entire disclosure of which is incorporated herein by reference.

After its preparation, the additive resin is preferably left in solution, and combined with a solution of modified precursor resin, using stirring to prepare a homogeneous solution. The polyfunctional molecule may then be added, and the mixture heated to remove solvent and achieve crosslinking as described above, to provide the resin composition of the invention. Alternatively, the solvent may be removed prior to the addition of the polyfunctional molecule, and the maleated precursor resin isolated. The maleated precursor resin and polyfunctional molecule may be caused to react (crosslink) in a high shear, high temperature apparatus (e.g., extruder) to provide the resin composition of the invention. If other toner components are added along with the resin and polyfunctional molecule, crosslinked toner may be produced directly. The resin composition comprises crosslinked resin and is bimodal as judged by a chromatogram obtained after gel permeation chromatography of the resin composition. The resin composition of the invention may also be referred to as a bimodal, crosslinked resin.

When the additive resin is combined with the modified precursor resin, the two resins are preferably combined in an additive resin:modified precursor resin weight ratio of about 20:80 to about 80:20.

The resin composition of the invention, incorporating both the additive resin and the crosslinked resin, may have a gel content of about 1 to about 80%, preferably about 5% to about 50%, and more preferably about 10% to about 30%. Gel content is measured by the following procedure:

Weigh ~10 g of resin into a tared extraction thimble and place the thimble in an extractor. Weigh about 200 g THF into 500 ml single-necked round-bottomed flask. The amount of THF used is unimportant as long as an abundant supply remains in the flask when the extractor is filled. Connect the extractor to a condenser and the flask containing THF. Position a heating mantle and heat the THF to reflux.

Allow the extraction to continue (THF at reflux) for 96 hrs. The extraction can be carried out continuously or shut down during period when it is unattended. If interrupted, the total refluxing time should not be less than about 96 hrs. When the extraction time is completed, the heat is removed and the THF remaining in the extractor is drained into the flask. The thimble is dried overnight at 120° C. to remove residual THF. The thimble and contents are weighed and the percentage gel in the resin calculated as the weight of insoluble resin divided by the total weight of resin, multiplied by 100.

The molecular weight of the THF soluble fraction of the resin composition can be obtained directly by injecting the THF solution onto a liquid chromatography apparatus. The THF can be removed from the solution of THF/soluble resin, and the resin subjected to additional testing if desired.

The resin composition may also be characterized by its melt point temperature as measured with, e.g., a Shimadzu CFT 500CU Flowtester. The melt point temperature is designated as either $T_m$ or $T_{1/2}$. The melt point temperature as obtained by the 1/2 method is calculated using one-half the difference (the mid point) between the extrusion end point and the minimum point (baseline prior to extrusion) from the flow curve as obtained from the Flowtester. Representative operating conditions for the Flowtester are: Mode: constant heating rate; Temperature rate: 6° C.; Set temperature: 80° C.; Maximum temperature: 160° C.; Interval: 3° C.; Preheat: 300 sec.; Load: 20 Kg; Die diameter: 1 mm; Die length: 1 mm; K factor: 1; and Plunger area: 1 cm². $T_m$ for resin compositions of the invention is about 130° C. to about 190° C., and preferably is about 140° C. to about 170° C.

Another characterizing feature of the resin composition is its melt flow index, which is conveniently measured in the temperature range of about 140° C. to about 190° C., with a flow time of 10 minutes. The melt flow index of the resin composition at 150° C. is about 1 to about 6 g, preferably about 1 to about 2 g, at a load of 2.16 Kg. The resin composition has a melt flow index at 190° C. of about 1 to about 75 g, preferably about 1 to about 30 g, under a pressure of 2.16 Kg. When the pressure at 190° C. is decreased to 1 Kg, the melt flow index is about 1 to about 25 g, preferably about 1 to about 15 g.

Another characterizing feature of the resin composition is its $T_g$, which preferably is about 52° C. to about 67° C.

Toner Powder Production

The resin composition of this invention is suitable for use in toners for both two component developers and monocomponent toners.

A preferred method to prepare toner powder for a two-component developer system using the bimodal crosslinked resin in this invention follows. Toner components typically employed are: resin (80–95%), colorant (2–10%), charge control agent (typically a dye or pigment) <1%, and waxes (0.5–5%). When external additives are added to further improve flow or charging characteristics, they may be added after classification (see below) or in a subsequent powder blending operation.

The powder blend may be melt-blended and extruded in a twin-screw extruder at ca. 150° C. The particle size of the extrudate may be reduced to ca. 100–500 microns with an impact (e.g., hammer) mill. The product from the hammer mill may be reduced to the final particle size range with a jet mill, where the final particle size is typically 8–20 microns. The particle size of 8–20 microns is the weight average diameter of the particles as measured, for example, with a Coulter counter. The finely ground powder may be classified in a classification step, to eliminate materials outside of the desired particle size range.

The toner powder of the invention may contain a colorant which may be a pigment or dye. Non-limiting examples of the pigment include: carbon black, aniline black, acetylene black, Naphthol Yellow, Hansa Yellow, Rhodamine Lake, Alizarin Lake, red iron oxide, Phthalocyanine blue, and Indanthrene Blue. These pigments are used in an amount sufficient to provide a required optical density of the fixed images, and may be added in a proportion of about 0.1 to about 20 parts, preferably about 2 to about 10 wt. parts, per 100 parts of the resin composition.

Examples of the dye include, without limitation, azo dyes, anthraquinone dyes, xanthene dyes, and methine dyes, which may be added in a proportion of about 0.1 to about 20 parts, preferably about 0.3 to about 10 parts, per 100 parts of the resin composition.

Charge control agents are preferably present in the toner powder. The use of charge control agents in toner powder is well known in the art. Examples of negative-charge control agent may include: organic metal complexes and chelate compounds, acetylacetone metal complexes, and organometallic complexes of aromatic hydroxycarboxylic acids and aromatic dicarboxylic acids. Other example may include: aromatic hydroxycarboxylic acids, aromatic mono- and poly-carboxylic acids, and their metal salts, anhydrides and esters, and phenol derivatives such as bisphenols.

Examples of positive-charge control agents may include: nigrosine and modified products thereof with aliphatic acid metal salts, etc., onium salts inclusive of quaternary ammonium salts, such as tributylbenzylammonium 1-hydroxy-4-naphtholsulfonate and tetrabutylammonium tetrafluoroborate, and their homologs inclusive of phosphonium salts, and lake pigments thereof; triphenylmethane dyes and lake pigments thereof (the laking agents including, e.g., phosphotungstic acid, phosphomolybdic acid, phosphotungsticmolybdic acid, tannic acid, lauric acid, gallic acid, ferricyanates, and ferrocyanates); higher aliphatic acid metal salts; diorganotin oxides, such as dibutyltin oxide, dioctyltin oxide and dicyclohexyltin oxide; and diorganotin borates, such as dibutyltin borate, dioctyltin borate and dicyclohexyltin borate.

It is also preferred to add about 0.5 to about 5 wt. % of a waxy substance, such as low-molecular weight polyethylene, low-molecular weight polypropylene, low-molecular weight propylene-ethylene copolymer, microcrystalline wax, carnauba wax, sasol wax or paraffin wax, to the toner powder for the purpose of improving the releasability of the toner at the time of hot roller fixation.

External additives which may be present in the toner powder, include, for example: a lubricant, such as polytetrafluoroethylene, zinc stearate or polyvinylidene fluoride; an abrasive, such as cerium oxide, silicon carbide or strontium titanate; a flowability-imparting agent, such as titanium oxide or aluminum oxide; and an anti-caking agent.

A further external additive is silica fine powder, which when blended into the toner powder formulation imparts improvement in the charge stability, developing characteristic and fluidity of the toner. The silica fine powder preferably has a specific surface area of about 30 $m^2/g$ or larger, preferably about 50–400 $m^2/g$, as measured by nitrogen adsorption according to the BET method. For the purpose of being provided with hydrophobicity and/or controlled chargeability, the silica fine powder may be treated with a treating agent, such as silicone varnish, modified silicone varnish silicone oil, modified silicone oil, silane coupling agent, silane coupling agent having functional group or other organic silicon compounds.

The toner powder according to the present invention can be mixed with carrier powder to be used as a two-component developer. In this instance, the toner powder and the carrier powder may be mixed with each other so as to provide a toner powder concentration of about 0.1 to about 50 wt. %, preferably about 0.5 to about 10 wt. %, and more preferably about 3 to about 5 wt. %. Carriers used for this purpose are known in the art, and examples include: powder having magnetism, such as iron powder, ferrite powder, and nickel powder and carriers obtained by coating these powders with a resin, such as a fluorine-containing resin, a vinyl resin or a silicone resin.

The toner powders described herein can employ various types of carrier vehicles ranging from the conventional inorganic particles used in cascade development and magnetic particles used in magnetic brush development to gaseous media and fur brushes used in powder cloud and fur brush development, respectively.

The bimodal crosslinked resin of this invention can be formulated into a monocomponent, magnetic toner by incorporating a magnetic material. The magnetic material may be one or a mixture of iron oxides, e.g., magnetite, γ-iron oxide, ferrite, and iron-containing ferrite metals. These magnetic materials preferably have a particle size of 0.1–0.5 microns. These magnetic particles preferably are present in an amount of 40–150 parts (weight) per 100 parts of bimodal crosslinked resin. The monocomponent toner has a weight average particle size of about 3 to about 15 microns, preferably about 4 to about 10 microns.

It is one of the characteristic features of the resin composition of the present invention that it contains a carboxyl group (a carboxylic acid unit). This functional group contributes to improvements in developability, fixing properties and the chargeability of toner powders comprising the toner composition of the invention. For example, where a carboxyl group is present in a resin chain, the binder resin has weak negative chargeability.

The invention will now be illustrated by the following non-limiting examples, which demonstrate the advantageous benefits of the present invention. In the example, all of "parts" or "pts" and "%" are by weight unless otherwise indicated.

EXAMPLES

Example 1

Precursor Resin

In step 1, a resin flask was flushed with nitrogen and charged with the monomers: 77 pts styrene and 23 pts n-butyl acrylate. The mixture was heated to 130° C. and allowed to polymerize in bulk for 3 hours. A conversion of 35% was obtained. The reaction mixture was diluted with 120 pts of xylene and the reaction temperature was reduced to 100° C.

In step 2, a solution consisting of 1 pt azobisisobutyronitrile (AIBN) in 80 pts xylene was added continually over a 10 hr-period to the diluted reaction mixture of step 1, maintained at 100° C. The resultant solution was stirred for an additional 2 hours to provide a 33% solids solution of poly(styrene-co-butyl acrylate).

Example 2

Modified Precursor Resin

A resin flask was charged with 1473 g of a resin solution prepared as in Example 1 (33% solids poly(styrene-co-butyl acrylate) and 22.1 g maleic anhydride (4.3% based on weight of resin in the resin solution). The mixture was heated to 115° C. with stirring. An initiator solution consisting of 6.0 g of 1,1-di(t-butyl peroxy)3,3,5-trimethylcyclohexane in 44.2 g xylene was added over 30 minutes. After the initiator solution was added, the reaction mixture was held at 115° C. with stirring for 5 hours.

The product has a total solids content of 33.3%. The anhydride number of the resin was 24.2, indicating a grafting efficiency of 98.4%.

Example 3

Additive Resin

A solution of 1000 g styrene and 100 g di t-butyl peroxide was added over 4 hours to 430 g xylene at 115° C. After the addition was completed, the contents were held at 115° C. with stirring for 5 hours. A 70% poly(styrene) resin (MW~5000) solution was obtained.

Example 4

Bimodal Crosslinked Resin

A distillation flask was charged with 450.5 g of a solution of modified precursor resin prepared as in Example 2 (total solids=33.3%), 214.3 g of a solution of additive resin prepared as in Example 3 (total solids=70%) from Example 3, and 7.3 g 1,4-butane diol. The mixture was heated under nitrogen to remove xylene. After the xylene was removed, the molten resin was held at 150°–190° C. for 1.5 hour with stirring to complete the anhydride ring opening crosslinking reaction with the diol. After the 1 hour reaction period, the distillation was completed by vacuum distilling at 190°–200° C./10 mmHg for 1 hour.

The resin was discharged from the flask and exhibited the following properties: Gel Content=28% (THF insoluble portion); Melt Index (150° C., 2160 g)=0.5 g/10 min; and Tm=140.5° C. (Midpoint temperature from the Shimadzu Flow Test in the Heat Mode).

Example 5

Crosslinking Using High Shear Apparatus

A laboratory simulation of crosslinking in production high shear equipment was conducted in a Brabender Model PL2100-6 Plasti-corder (C. W. Brabender Co., So Hackensack, N.J.). A Plasti-corder equipped with a 60 ml mixing chamber and roller type mixing blades was charged with 45 g of a 5 wt. % maleated resin and 0.6 g of 1,4-butane diol. The mixture was processed at 140° C. and 20 rpms for 15 minutes. The initial load torque was 5004 meter grams (MG) but decreased to 455 MG upon mastication of the polymer. Upon curing the torque value increased to 511 MG. The cure time was 3.5 minutes.

| | COMPARATIVE RESIN PROPERTIES | |
|---|---|---|
| | Before Processing | After Processing |
| Tg (°C.) | 59.8 | 58.0 |
| Melt Index (150° C., 2.16 Kg) | 2.9 | too slow to extrude |
| Shimadzu Flowtester (1): | | |
| $T_{1/2}$ | 134.6 | 139.6 |
| $T_i$ | 108.8 | 111.0 |

(1) Load = 20 Kg, rate = 6° C./min, die orifice 1 mm × 1 mm.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A process for preparing a crosslinked resin comprising the steps of (a) preparing a mixture of maleic anhydride, free-radical initiator, and precursor resin formed by the polymerization of at least one ethylenically unsaturated monomer, (b) heating the mixture of step (a) to a first temperature sufficient to cause maleic anhydride to graft onto said precursor resin and form a modified precursor resin having appended cyclic anhydride groups, (c) adding to said modified precursor resin having appended cyclic anhydride groups a polyfunctional molecule having functional groups reactive with an anhydride group, and (d) heating the mixture of step (c) to a second temperature sufficient to cause covalent bonding between said functional groups and said appended cyclic anhydride groups and thereby form a crosslinked resin.

2. The process according to claim 1 wherein the ethylenically unsaturated monomer is selected from the group consisting of acrylic ester; methacrylic ester; styrenic compound; dialkyl ester of α,β-unsaturated dibasic acid; vinyl ester; acrylonitrile; methacrylonitrile; acrylamide; methacrylamide; α,β-unsaturated carboxylic acid; α,β-unsaturated dicarboxylic acid; monoester of α,β-unsaturated dicarboxylic acids; polyvinyl compound; and unsaturated conjugated diolefin monomers.

3. The process according to claim 2 wherein said polyvinyl compound is selected from the group consisting of divinyl benzene, diacrylic acid, dimethacrylic acid, diacrylate and dimethacrylate, and comprises no more than 10 parts out of 100 parts of said ethylenically unsaturated monomer.

4. The process according to claim 1 wherein the ethylenically unsaturated monomer is selected from the group consisting of styrene, acrylic acid, acrylate ester of $C_1$–$C_{18}$ alcohols, methacrylic acid and methacrylate ester of $C_1$–$C_{18}$ alcohols.

5. The process according to claim 1 wherein said precursor resin and maleic anhydride are contacted in a precursor resin:maleic anhydride weight ratio of about 99.9:0.1 to about 80:20.

6. The process according to claim 5 wherein said precursor resin:maleic anhydride weight ratio is about 99:1 to about 85:15.

7. The process according to claim 1 wherein said polyfunctional molecule contains functional groups selected from the group consisting of hydroxyl, amine and mercaptan.

8. The process according to claim 1 wherein said polyfunctional molecules are selected from the group consisting of molecules with the formula $R^2[—(A—O)_s—LH_b]_c$, $LH_{(b+1-g)}[(A—O)_s—A—LH_b]_g$, $HO—[R^4—OC(=O)—R^5—C(=O)O—R^4—O]_n—H$ and $H_2N—[R^6—NH(C=O)—R^5—C(=O)NH—R^6—NH]_n—H$, wherein independently at each occurrence, $R^2$ is a multivalent organic moiety having 2 to about 20 carbon atoms, $R^4$ is a $C_2$–$C_{20}$ divalent organic moiety, $R^5$ is a direct bond or a $C_1$–$C_{12}$ divalent organic moiety, $R_6$ is a $C_2$–$C_{12}$ divalent organic moiety, b is 1 when L is O or S, and 2 when L is N, c is an integer from 2 to 6, g is 2 when L is oxygen or sulfur and 2 or 3 when L is nitrogen, n is an integer from 2 to about 100, s is 0 or an integer from 1 to about 50, A is —$CH_2CH_2$— or —$CH_2CH(CH_3)$—, and L is oxygen (O), nitrogen (N) or sulfur (S).

9. The process according to claim 8 wherein said polyfunctional molecules are selected from the group consisting of 1,2-ethane diol, 1,2-propane diol, 1,3-propane diol, 1,3-butane diol, 1,4-butane diol, 1,6-hexane diol, neopentyl glycol, diethylene glycol, dipropylene glycol, ethoxylated and/or propoxylated derivatives of bisphenol-A, polyalkylene oxides including poly(ethylene oxide) and poly(propylene oxide), hydrogenated bis-phenol-A, glycerol, trimethylolpropane and trimethylolethane.

10. The process according to claim 1 wherein said precursor resin has a number average molecular weight of about 1,000 to about 200,000.

11. The process according to claim 1 wherein said modified precursor resin has an anhydride number of about 1 to about 80.

12. The process according to claim 1 wherein said mixture of step (a) further comprises a non-aqueous hydrocarbon solvent selected from the group consisting of benzene, toluene, xylene, cumene and ethyl benzene.

13. The process according to claim 1 wherein said first temperature is about 60° C. to about 140° C. and said second temperature is about 120° C. to about 200° C.

14. The process according to claim 1 wherein said mixture of step (b) additionally comprises non-aqueous solvent.

15. A process for preparing a bimodal resin composition comprising adding an additive resin to the mixture of step (c) in claim 1, wherein said additive resin is a polymeric material having a number average molecular weight less than a number average molecular weight of said precursor resin.

16. The process according to claim 15 wherein said additive resin is formed by the polymerization of at least one ethylenically unsaturated monomer selected from the group consisting of acrylic ester, including N,N-dialkylaminoalkanol esters of acrylic acid; methacrylic ester, including N,N-dialkylaminoalkanol esters of methacrylic acid ; styrenic compounds; dialkyl ester of α,β-unsaturated dibasic acid; vinyl ester; acrylonitrile; methacrylonitrile; acrylamide; methacrylamide; α,β-unsaturated carboxylic acid; α,β-unsaturated dicarboxylic acid; monoester of α,β-unsaturated dicarboxylic acids; and unsaturated conjugated diolefin monomers.

17. The process according to claim 16 wherein said ethylenically unsaturated monomer is selected from the group consisting of styrene, α-methylstyrene and vinyl toluene.

18. The process according to claim 15 wherein said additive resin and said modified precursor resin are present in said mixture of step (d) in a additive resin:modified precursor resin weight ratio of about 20:80 to about 80:20.

19. The process according to claim 15 wherein said additive resin has a number average molecular weight of about 1,000 to about 10,000, and the number average molecular weight of said additive resin is less than the number average molecular weight of said precursor resin.

20. The process according to claim 1 wherein the mixtures of steps (a) through (d) include a solvent, and the grafting and covalent bonding are carried out in solution.

21. The process according to claim 1 wherein at least one of the mixtures of steps (a) through (d) includes a solvent, and the respective step is carried out in solution.

22. The process according to claim 1, wherein at least steps (c) and (d) are carried out neat in a high shear apparatus.

* * * * *